(12) United States Patent
Chaudhuri et al.

(10) Patent No.: US 10,292,179 B2
(45) Date of Patent: May 14, 2019

(54) MAXIMIZING A FRAME'S ARRANGEMENT THEREBY INCREASING PROCESSING TIME AVAILABLE TO PROCESSORS

(71) Applicant: QUALCOMM Incorporated, San Diego, CA (US)

(72) Inventors: Arunava Chaudhuri, San Diego, CA (US); Alexei Yurievitch Gorokhov, San Diego, CA (US)

(73) Assignee: QUALCOMM Incorporated

( * ) Notice: Subject to any disclaimer, the term of this patent is extended or adjusted under 35 U.S.C. 154(b) by 7 days.

(21) Appl. No.: 15/456,283

(22) Filed: Mar. 10, 2017

(65) Prior Publication Data

US 2018/0092111 A1    Mar. 29, 2018

Related U.S. Application Data

(60) Provisional application No. 62/400,993, filed on Sep. 28, 2016.

(51) Int. Cl.
| | |
|---|---|
| *H04W 72/12* | (2009.01) |
| *H04L 5/00* | (2006.01) |
| *H04L 1/00* | (2006.01) |
| *H04L 1/18* | (2006.01) |
| *H04W 72/10* | (2009.01) |

(52) U.S. Cl.
CPC ....... *H04W 72/1247* (2013.01); *H04L 1/0078* (2013.01); *H04L 1/1854* (2013.01); *H04L 1/1887* (2013.01); *H04L 5/0044* (2013.01); *H04L 5/0048* (2013.01);
(Continued)

(58) Field of Classification Search
None
See application file for complete search history.

(56) References Cited

U.S. PATENT DOCUMENTS 9,312,997 B2   4/2016  Kim et al.
9,445,406 B2   9/2016  Suzuki et al.
(Continued)

FOREIGN PATENT DOCUMENTS

| WO | WO-2008078968 A1 | 7/2008 | |
| WO | WO-2008140223 A1 | 11/2008 | |
| WO | WO-2016053844 A1 * | 4/2016 | ........... H04L 1/1607 |

OTHER PUBLICATIONS

International Search Report and Written Opinion—PCT/US2017/048648—ISA/EPO—dated Dec. 1, 2017.
(Continued)

*Primary Examiner* — Jamaal R Henson
(74) *Attorney, Agent, or Firm* — Norton Rose Fulbright LLP

(57) ABSTRACT

Embodiments herein maximize frame usage by selectively arranging the data within the frame thereby giving the transmitting processor additional time generate and transmit the data within the frame without increasing the time gap G of the frame and without increasing the overall length of the frame. Further, the selective arrangement also gives the receiving processor additional time to process the data of the frame and send Ack/Nack information regarding the success/failure of the processing without increasing the time gap G of the frame and without increasing the overall length of the frame. Other aspects, embodiments, and features are also claimed and described.

30 Claims, 10 Drawing Sheets

(52) U.S. Cl.
CPC .......... *H04L 5/0055* (2013.01); *H04L 5/0064* (2013.01); *H04W 72/10* (2013.01); *H04W 72/1273* (2013.01)

(56) References Cited

U.S. PATENT DOCUMENTS

| | | | |
|---|---|---|---|
| 9,615,360 B2* | 4/2017 | Qu | ...................... H04W 72/042 |
| 2014/0029584 A1* | 1/2014 | Qu | ...................... H04W 72/042 |
| | | | 370/336 |
| 2014/0369324 A1 | 12/2014 | Lin et al. | |
| 2014/0376471 A1 | 12/2014 | Nishio et al. | |
| 2016/0330011 A1 | 11/2016 | Lee et al. | |

OTHER PUBLICATIONS

Nokia et al., "Punctured Scheduling for Low Latency Transmissions", 3GPP Draft; R1-167308, 3rd Generation Partnership Project (3GPP), Mobile Competence Centre, 650, Route Des Lucioles, F-06921 Sophia-Antipolis Cedex, France, vol. RAN WG1, No. Gothenburg, Sweden; Aug. 21, 2016, XP051125827, Retrieved from the Internet: URL:http://www.3gpp.org/ftp/Meetings_3GPP_SYNC/RAN1/Docs/ [retrieved on Aug. 21, 2016], 4 pages.

Pedersen K., et al., "A Flexible Frame Structure for 5G Wide Area", 2015 IEEE 82nd Vehicular Technology Conference (VTC 2015—Fall), Sep. 6, 2015, pp. 1-5, XP032856972, DOI: 10.1109/VTCFALL. 2015.7390791 [retrieved on Jan. 25, 2016], 5 pages.

Zte et al., "Multiplexing of eMBB and URLLC", 3GPP Draft; R1-166408, 3rd Generation Partnership Project (3GPP), Mobile Competence Centre, 650, Route Des Lucioles, F-06921 Sophia-Antipolis Cedex, France, vol. RAN WG1, No. Gothenburg, Sweden; Aug. 21, 2016, XP051140214, Retrieved from the Internet: URL:http://www.3gpp.org/ftp/Meetings_3GPP_SYNC/RAN1/Docs [retrieved on Aug. 21, 2016], 10 pages.

* cited by examiner

MAXIMIZING A FRAME'S ARRANGEMENT THEREBY INCREASING PROCESSING TIME AVAILABLE TO PROCESSORS

CROSS-REFERENCE TO RELATED APPLICATIONS

This application claims the benefit of U.S. Provisional Patent Application No. 62/400,993, entitled, "MAXIMIZING A FRAME'S ARRANGEMENT THEREBY INCREASING PROCESSING TIME AVAILABLE TO PROCESSORS," filed on Sep. 28, 2016, the disclosure of which is hereby incorporated by reference herein in its entirety as if fully set forth below and for all applicable purposes.

TECHNICAL FIELD

Aspects of the present disclosure relate generally to communication systems, and more particularly, to selectively arranging data within a frame for wireless communication purposes. Embodiments enable and provide increasing an amount of time one or more processors have to process information within a frame without increasing the time span of the frame or reducing the amount of data included within the frame.

INTRODUCTION

The use of wireless communication devices has diversified over time, and users expect endlessly increasing services on their User Equipment (UE). UEs are no longer restricted to phone calls and email access. Rather, users are more likely use their devices for live video calls, streaming high definition multimedia, playing real-time interactive games, and more. Wireless communication systems are tasked with uplinking and downlinking significantly more amounts of data in significantly less amounts of time in order to keep up with the new UE applications users demand.

In response, the industry moved toward Long-Term Evolution (LTE) standards to keep up with the increased demand for data. LTE enabled communication systems to increase the amount of data being transmitted through the air yet processors tasked with processing the increased amount of data were not keeping up with user demands. For example, when a first frame of data arrived, the receiver began processing the data. And when a second frame of data would arrive before the receiver finished processing the first frame of data. Then, a third frame of data would arrive before the receiver caught up to the second frame of data. This inability to process data in arriving frames caused backlogs, data loss, user experience issues, and in some instances power conservation challenges.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

So, in an effort to overcome these problems, processors may be configured to interlace multiple frames in an effort to give the processors more time to process the increased amount of data in pipelined fashion. Summarily, a processor may wait until several frames for the pipeline to fully process the data for a frame and thereafter send an acknowledgement/non-acknowledgement (Ack/Nack) message indicating the success or failure of the data within the that interlaced frame. For example, the processor may wait until four frames have passed, and thereafter send an Ack/Nack regarding the data in the first subframe. While this method succeeds in giving processors additional time to process the data in pipelined fashion, the method causes major latency problems. For instance, if drone controlling or robotic surgery is done in real-time, receiving a Nack message four frames after the data was lost causes delay, more processing complexity and additional buffering. For applications that count on a high data rate, ultra-low latency mission critical functionality users experience long and frequent buffer times leading to jittery remote control. In short, the method may cause user dissatisfaction.

In response to this user dissatisfaction, self-contained frames are developed. Upon receiving a self-contained frame, the processor processes the entire frame and sends an Ack/Nack message regarding all the information within the self-contained frame before beginning to process the next received frame. As such, the system discovers the loss of data in almost real-time and resolves the data loss much more quickly. This solution reduces the latency issues explained above. That being said, the processors are still having to process copious amounts of data, which cannot be pipelined. That being said, the self-contained frame solution needs to accommodate the processor's processing time needs. The self-contained frame method provides the processors with additional processing time by building gaps into the self-contained frame. Gaps are portions of the self-contained frame that include no data or useless data (e.g., data that is not processed) and give the processor time to process the data that is within the self-contained frame.

The provided gaps are important to the self-contained frame solution because without the gaps, the problems described above would recur (e.g., the second frame of data would arrive before the receiver finished processing the first frame of data, and the third frame of data would arrive before the receiver caught up to the second frame of data thereby causing backlogs and data loss). However, at a tipping point, the gaps themselves begin to be a problem. As a self-contained frame includes more and more information, processors need more and more time to process the data. Thus, the self-contained frame needs larger and larger gaps to give the processor enough time to process all the data therein. However, gaps comprise no data (or useless data). As such, as the gaps increase in size, the amount of data transmitted between the gaps decreases. This may not be a problem with burst transmissions wherein the length of a self-contained frame is inconsequential. However, in wireless communications (e.g., 5G) the length of a frame may be fixed (e.g., the timeline of the frame). As such, in a frame that may have a fixed length, expanding the gap's length decreases the amount of substantive data that can be transmitted in the frame. Embodiments herein provide solutions to the above identified problems Embodiments herein arrange data within frames in such a way that gives processors more time to process the data within the frames. In some embodiments, the frames may be fixed length frames. In embodiments, arrangements of data may be accomplished without increasing gaps within the frames, without increasing the length (e.g., time span) of the frames, and without reducing the amount of data included within the frames. Principles of the technology discussed herein can be used for wireless transmissions between network and non-network devices in uplink and downlink fashion and also in device to device fashion too.

In embodiments, a method selectively arranges data of Downlink (DL) frames. When creating DL frames, a processor may generate data for transmission on a plurality of Physical Downlink Shared Channels (PDSCHs). The PDSCHs may be grouped into various PDSCH groups and prioritized such that each PDSCH group has a respective priority rating. The processor may arrange a current DL frame such that a PDSCH group having a highest priority rating is located after (e.g., immediately after) a Demodulation Reference Signal (DMRS) of the current DL frame and one of the PDSCH groups having a non-highest priority rating is located within the current DL frame after the PDSCH group having the highest priority rating. Further, the processor may arrange the current DL frame such that another of the PDSCH groups having a non-highest priority rating is delayed and included within a subsequent DL frame, which is transmitted after the current DL frame.

The processor may include a gap (G) within the current DL frame and arrange G after the current DL frame's PDSCH groups having a non-highest priority rating. This G, along with data from non-highest priority groups, provides the processors with processing time to create an Ack/Nack for the PDSCH groups that were included in the current DL frame such that the Ack/Nack for these PDSCH groups is received during the current DL frame. That being said, the current DL frame is not self-contained because the other PDSCH group having a non-highest priority rating was delayed and included within a subsequent DL frame. This PDSCH group having a non-highest priority rating is transmitted after the current DL frame. Delaying this PDSCH group gives the processor more time to process the data of the PDSCH group without increasing the G of the current DL frame. Further, including this PDSCH group within the subsequent DL frame, which is transmitted after the current DL frame, causes the Ack/Nack for this PDSCH group to be minimally delayed (e.g., delayed by a single frame) thereby preventing latency problems.

In embodiments, a method selectively arranges data of Uplink (UL) frames. When creating UL frames, a processor may generate data for transmission in a plurality of Physical Uplink Shared Channels (PUSCHs) and group the PUSCHs into a plurality of PUSCH groups. The PUSCH groups may be prioritized and given respective priority ratings.

Further, the processor may arrange the current UL frame such that a PUSCH group having a highest priority rating is located after (e.g., immediately after) a Demodulation Reference Signal (DMRS) of the current UL frame and one of the PUSCH groups having a non-highest priority rating is located thereafter. Moreover, the processor may arrange the current UL frame such that the other of the PUSCH groups having a non-highest priority rating are delayed and included within a successor UL frame, which is transmitted after the current UL frame.

The processor may include a gap (G) within the current UL frame and arrange G before the DMRS and the highest prioritized PUSCH of the current UL frame. This G, along with other non-highest priority data symbols, provides the processors with processing time to generate data being transmitted in the PUSCH groups. That being said, the current UL frame is not self-contained because the other PUSCH group having a non-highest priority rating was delayed and included within a successor UL frame, which is transmitted after the current UL frame. Delaying this PUSCH group gives the processor more time to process the data being included in this PUSCH group without increasing the G of the current UL frame. Further, including this PUSCH group within the successor UL frame, which is transmitted after the current UL frame, causes the Ack/Nack for this PUSCH group to be minimally delayed (e.g., delayed by a single frame) thereby preventing latency problems.

As such, increased processing time is obtained by selectively transmitting one or more of the groups of PDSCH/PUSCH symbols within the current UL frame while selectively delaying transmission of one or more of the groups of PDSCH/PUSCH symbols and transmitting the delayed one or more groups of PDSCH/PUSCH symbols in a successor UL frame. Moreover, increased processing time is also obtained by selectively arranging the location of the PDSCH/PUSCH symbols with respect to the location of the G and the DMRS symbol of the frames.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
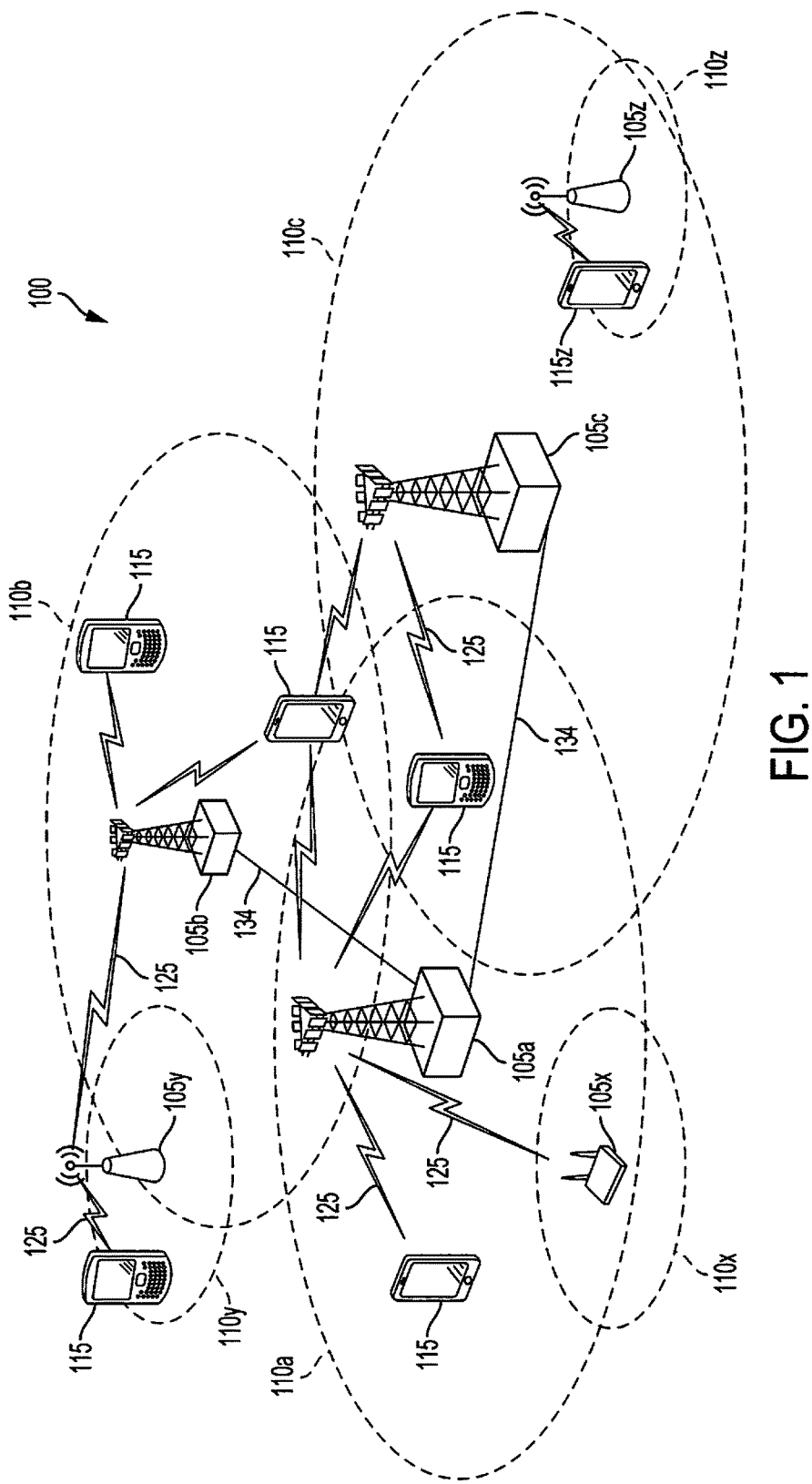
FIG. 1 is a block diagram illustrating details of a wireless communication system according to some embodiments.

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5G networks, Internet of Everything networks, Internet of Things networks, as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. For clarity, certain aspects of the apparatus and techniques may be described below for LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces. Various types of networks may be used to deploy embodiments and premises of the technology discussed herein.

A new carrier type based on LTE/LTE-A including in unlicensed spectrum has also been suggested that can be compatible with carrier-grade WiFi, making LTE/LTE-A with unlicensed spectrum an alternative to WiFi. LTE/LTE-A, when operating in unlicensed spectrum, may leverage LTE concepts and may introduce some modifications to physical layer (PHY) and media access control (MAC) aspects of the network or network devices to provide efficient operation in the unlicensed spectrum and meet regulatory requirements. The unlicensed spectrum used may range from as low as several hundred Megahertz (MHz) to as high as tens of Gigahertz (GHz), for example. In operation, such LTE/LTE-A networks may operate with any combination of licensed or unlicensed spectrum depending on loading and availability. Accordingly, it may be apparent to one of skill in the art that the systems, apparatus and methods described herein may be applied to other communications systems and applications.

System designs may support various time-frequency reference signals for the downlink and uplink to facilitate beamforming and other functions. A reference signal is a signal generated based on known data and may also be referred to as a pilot, preamble, training signal, sounding signal, and the like. A reference signal may be used by a receiver for various purposes such as channel estimation, coherent demodulation, channel quality measurement, signal strength measurement, and the like. MIMO systems using multiple antennas generally provide for coordination of sending of reference signals between antennas; however, LTE systems do not in general provide for coordination of sending of reference signals from multiple base stations or eNBs.

In some implementations, a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. Reciprocity may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations, orthogonal frequency division multiplexing (OFDM) is used for the downlink—that is, from a base station, access point or eNodeB (eNB) to a user terminal or UE. Use of OFDM meets the LTE requirement for spectrum flexibility and enables cost-efficient solutions for very wide carriers with high peak rates, and is a well-established technology. For example, OFDM is used in standards such as IEEE 802.11a/g, 802.16, High Performance Radio LAN-2 (HIPERLAN-2, wherein LAN stands for Local Area Network) standardized by the European Telecommunications Standards Institute (ETSI), Digital Video Broadcasting (DVB) published by the Joint Technical Committee of ETSI, and other standards.

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in the 3GPP specifications, such as, for example, 3GPP TS 36.211.

UMTS LTE supports scalable carrier bandwidths from 20 MHz down to 1.4 MHZ. In LTE, an RB is defined as 12 sub-carriers when the subcarrier bandwidth is 15 kHz, or 24 sub-carriers when the sub-carrier bandwidth is 7.5 kHz. In an exemplary implementation, in the time domain there is a defined radio frame that is 10 ms long and consists of 10 subframes of 1 millisecond (ms) each. Every subframe consists of 2 slots, where each slot is 0.5 ms. The subcarrier spacing in the frequency domain in this case is 15 kHz. Twelve of these subcarriers together (per slot) constitute an RB, so in this implementation one resource block is 180 kHz. Six Resource blocks fit in a carrier of 1.4 MHz and 100 resource blocks fit in a carrier of 20 MHz.

FIG. 1 shows a wireless network 100 for communication, which may be an LTE-A network (other types of networks may also be utilized). The wireless network 100 includes a number of evolved node Bs (eNBs) 105, gNBs, and other network entities. An eNB and/or gNB may be a station that communicates with the UEs and may also be referred to as a base station, a node B, an access point, and the like. Each eNB 105 may provide communication coverage for a particular geographic area. The term "cell" can refer to this particular geographic coverage area of an eNB and/or an eNB subsystem serving the coverage area, depending on the context in which the term is used.

An eNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. In the example shown in FIG. 1, the eNBs 105a, 105b and 105c are macro eNBs for the macro cells 110a, 110b and 110c, respectively. The eNBs 105x, 105y, and 105z are small cell eNBs, which may include pico or femto eNBs that provide service to small cells 110x, 110y, and 110z, respectively. An eNB may support one or multiple (e.g., two, three, four, and the like) cells.

The wireless network 100 may support synchronous or asynchronous operation. For synchronous operation, the eNBs may have similar frame timing, and transmissions from different eNBs may be approximately aligned in time. Synchronous networks may organize cells into zones, wherein a zone comprises a plurality of cells. The zones of a wireless network may allocate zone specific resources such that a UE may move freely throughout a zone using the same zone specific resources as it travels from one cell to another. For asynchronous operation, the eNBs may have different frame timing, and transmissions from different eNBs may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, watch, or the like. Regarding the Internet of Things (IoT), a UE may be referred to as a IoT UE which may be an appliance, thermostat, water meter, electric meter, gas meter, sprinkler system, refrigerator, hot water heater, oven, car, navigation system, pace maker, implanted medical device, location tracker, bicycle computer, entertainment device, television, monitor, vehicular component, vending machine, medical device, and the like. A UE may be able to communicate with macro eNBs, pico eNBs, femto eNBs, relays, and the like. In FIG. 1, a lightning bolt (e.g., communication links 125) indicates desired transmissions between a UE and a serving eNB, which is an eNB designated to serve the UE on the downlink and/or uplink, or desired transmission between eNBs.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively. The devices illustrated in FIG. 1 are operable to carry out the techniques and operations disclosed herein.

As explained above, the growing demand for mobile broadband access has created an increase in communications between an eNB and a UE. Traditionally, all of the mobile originated (MO) data transmission steps are performed before each MO transmission, and every mobile terminated (MT) transmission step is performed before every MT transmission. Typically, all of the setup steps are repeated a multitude of times throughout an hour tying up a considerable about of network bandwidth and UE battery life.

Figure 2:
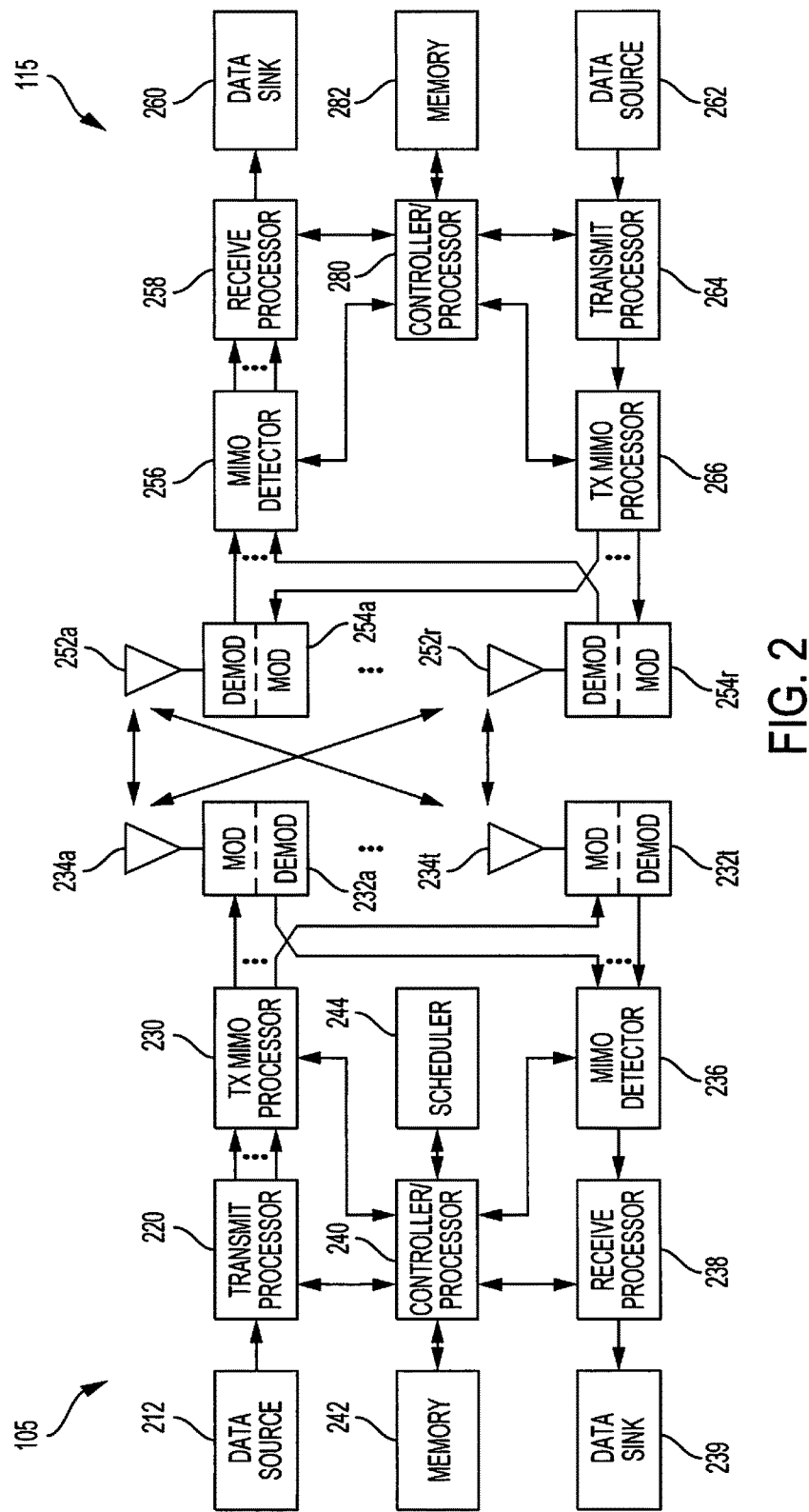
FIG. 2 is a block diagram conceptually illustrating a design of a base station/eNB and a UE configured according to some embodiments.

Further, because these steps are repeated for each transmission, the setup steps increase data latency. As such, it would be desirable to have systems and methods that allow for the reduction of the aforementioned steps and communications prior to MO and/or MT communications. That being said, there may be times when performing most or all of the previous steps may be appropriate due to the type of data being sent, the mobility of the UE, and/or the status of the UE. Thus, it would be further desirable to have systems and methods operable to determine which steps and communications are appropriate given the circumstances and configure the UE to perform a reduced set of steps and communications when appropriate and perform a robust set of steps and communications when appropriate FIG. 2 shows a block diagram of a design of a base station/gNB/eNB 105 and a UE 115, which may be one of the base stations/eNBs and one of the UEs in FIG. 1. For a restricted association scenario, the eNB 105 may be the small cell eNB 105z in FIG. 1, and the UE 115 may be the UE 115z, which in order to access small cell eNB 105z, would be included in a list of accessible UEs for small cell eNB 105z. The eNB 105 may also be a base station of some other type. The eNB 105 may be equipped with antennas 234a through 234t, and the UE 115 may be equipped with antennas 252a through 252r.

At the eNB 105, a transmit processor 220 may receive data from a data source 212 and control information from a controller/processor 240. The control information may be for the PBCH, PCFICH, PHICH, PDCCH, etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the eNB 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the eNB 105. At the eNB 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the eNB 105 and the UE 115, respectively. The controller/processor 240 and/or other processors and modules at the eNB 105 may perform or direct the execution of various processes for the techniques described herein. The controllers/processor 280 and/or other processors and modules at the UE 115 may also perform or direct the execution of the functional blocks illustrated in FIGS. 3-4, and/or other processes for the techniques described herein. The memories 242 and 282 may store data and program codes for the eNB 105 and the UE 115, respectively. A scheduler 244 may schedule UEs for data transmission on the downlink and/or uplink.

Figure 3A:
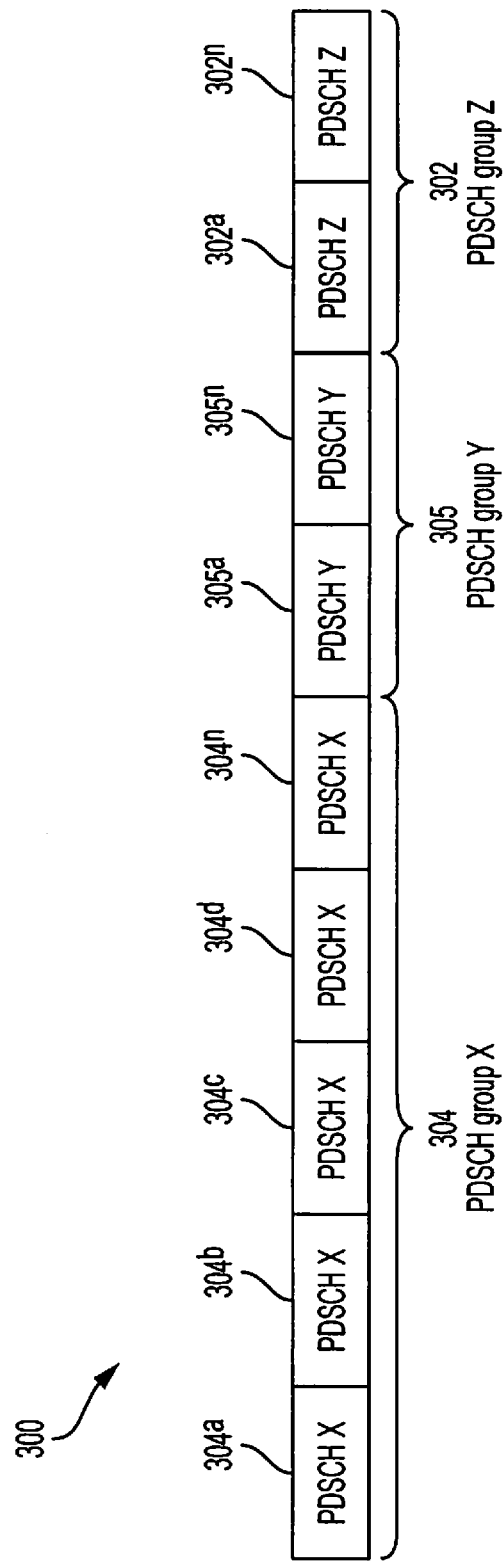
FIG. 3a is an example of a plurality of Physical Downlink Shared Channel (PDSCH) symbols, which are to be downlinked according to some embodiments.

FIG. 3a illustrates an example of sending data on a plurality of Physical Downlink Shared Channel (PDSCH) symbols (e.g., $302^a$-$302^n$, $304^a$-$304^n$, and $305^a$-$305^n$) that are intended for incorporation into a frame 300 being generated by a transmitting processor. A PDSCH may be used to transmit a myriad of different information that may or may not be time pertinent. For example, a PDSCH may include time pertinent user data (e.g., streaming video, telephone calls, website data, SMS messages, etc.), and/or a PDSCH may include sideband data and/or broadcast information (e.g., System Information Blocks (SIB), paging, Radio Resource Control (RRC), signaling messages, search reports, measurements, interference measurement, etc.) that is comparatively less time pertinent. Further, if desired, a PDSCH may merely be a place holder (e.g., carry no information or useless information) and therefore be less pertinent.

The PDSCHs of an intended frame 300 may be grouped into n number of groups. For the sake of clarity, the groups are referred to as PDSCH groups. In this example, the PDSCHs intended for frame 300 are grouped into three PDSCH groups: PDSCH group X 304, PDSCH group Y 305, and PDSCH group Z 302. A PDSCH group may have any number of PDSCH symbols within. In embodiments, a PDSCH group may be selected based on the type of information within the PDSCH. For example, PDSCHs comprising time pertinent information may be grouped together into one or more PDSCH groups. Further, PDSCHs comprising non-time pertinent information may be grouped together into one or more PDSCH groups. In another example, PDSCHs comprising telephone calls may be grouped together into one or more PDSCH groups. Then, PDSCHs comprising sideband data may be grouped together into one or more PDSCH groups. In yet another example, PDSCHs comprising information for which a provider, customer, user, etc. has paid a premium may be grouped together into one or more PDSCH groups. Moreover, PDSCHs comprising information for which no premium has been paid may be grouped together into one or more PDSCH groups.

Regardless of the method and/or system used to group the PDSCH groups, the system (e.g. transmit processor 230)

may determine that one or more of the PDSCH groups include information that the TX processor 230 would prefer to be fully processed with a single frame. Further, the TX processor 230 may determine that others of the PDSCH groups include information of the type that processing during a single frame is comparatively less important. The TX processor 230 may prioritize the PDSCH groups according to a range or spectrum of priorities. For example, one or more of the PDSCH groups may be a highest priority, a middle priority, a lower priority, a lowest priority, etc. Further, the PDSCH groups may be prioritized as highest priority and non-highest priority. For example, the TX processor 230 may prioritize PDSCH groups including user data (e.g., streaming video, telephone calls, website data, SMS messages, etc.) as the highest and/or higher priority and prioritize PDSCH groups including sideband data as lowest and/or lower priority. In this example, the PDSCH groups are organized such that: PDSCH group X 304 comprises PDSCH symbol X $304^a$ through PDSCH symbol X $304^n$; PDSCH group Y 305 comprises PDSCH symbol Y $305^a$ through PDSCH symbol Y $305^n$; and PDSCH group Z 302 comprises PDSCH symbol Z $302^a$ through PDSCH symbol Z $302^n$. The processor determines that PDSCH group X 304 is of a highest priority and would preferably receive Ack/Nack information regarding PDSCH group X 304 within its present frame. Further, in this example, the processor determines that PDSCH group Y 305 and PDSCH group Z 305 are of lesser priority and receiving the groups' Ack/Nack information within its present frame is of less importance. As such, processing PDSCH group Y 305 and PDSCH group Z 305 within a single frame is less important as compared to PDSCH group X 304.

Figure 3B:
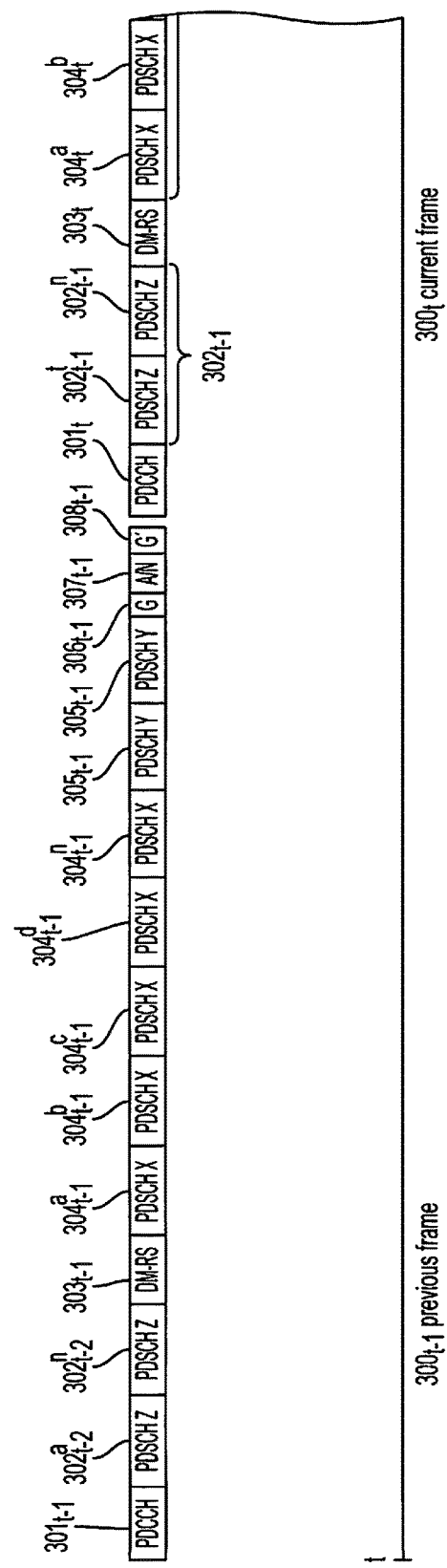
FIG. 3b is an example of three DL frames according to some embodiments.
Figure 3B:
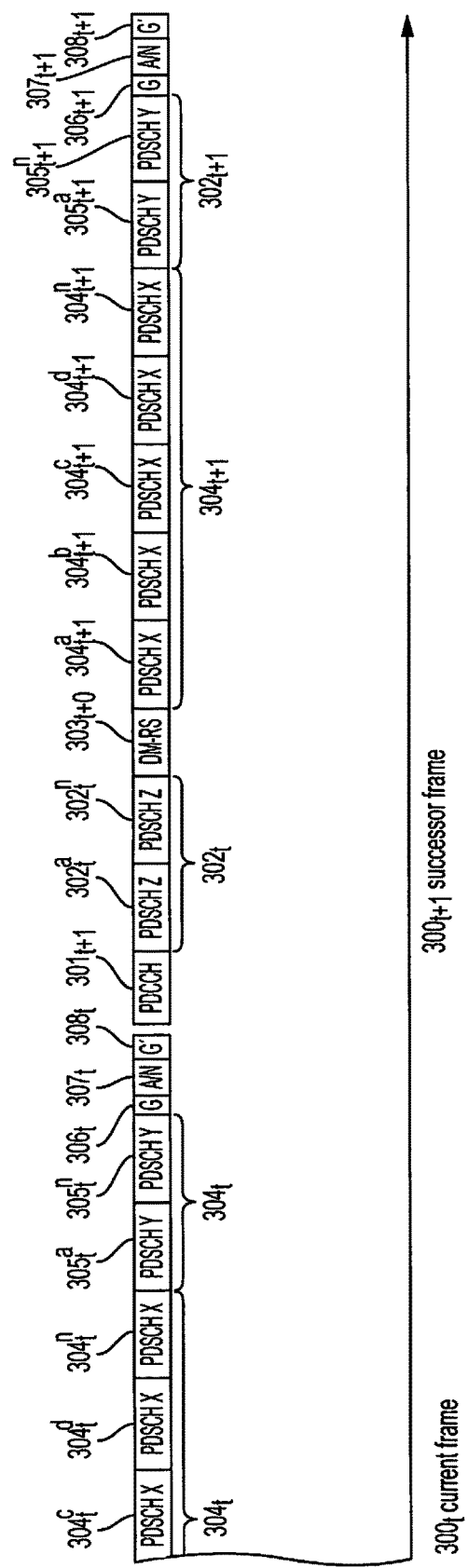

When a transmitting processor 230 constructs a frame for transmission, the groups of PDSCH symbols are selectively arranged within one or more frames. Arrangement can be done in such a way that gives a receiving processor 258 appropriate time to process the PDSCH symbols and generate Ack/Nack information for each group of PDSCH symbols without increasing the G period of time or increasing the time period of the frame. This arrangement leads to better utilization of the frame because higher priority data is processed within a single frame while lower priority data is processed thereafter in one or more frames. Further, the selectively arranged PDSCH symbols also give the transmitting processor 230 additional time to generate the symbols of the frame without increasing the G period of time or increasing the time period of the frame. FIG. 3b illustrates one of multiple ways the transmitting processor may arrange information within one or more frames in order to better utilize the frames.

FIG. 3b shows three example DL frames illustrated with respect to time. These include: previous DL frame 300t−1, current DL frame 300t, and subsequent DL frame 300t+1, each of which may be generated, transmitted, received, and processed by the methods, systems, and/or devices described herein. In this example, the present time is represented as t. As such, previous DL frame 300t−1 was generated, transmitted, received, and processed in the past (e.g., t−1), current DL frame 300t is currently being generated, transmitted, received, and processed (e.g., t), and successor DL frame 300t+1 will be a next frame to be generated, transmitted, received, and processed (e.g., t+1).

This example will start with current DL frame 300t. In this embodiment, the TX processor 230 identifies data that is of comparative importance (e.g., user data) and prefers that the data within PDSCH group X 304 be fully processed within the present frame. Further, the TX processor 230 determined that fully processing the data within PDSCH group Y 302 and/or PDSCH group Z 305 within the present frame is comparatively of less importance (e.g., less pertinent user data and/or sideband data). With the PDSCH groups partitioned and the pertinence of their timing established, the transmitting processor selectively arranges the PDSCH symbols within one or more frames in such a way that gives the receiving processor more time to process the symbols and generate Ack/Nack information, which will be sent back to the transmitting processor. Further, this arrangement gives the transmitting processor more time to select which PDSCH symbols to generate and more time to transmit the PDSCH symbols in the one or more frames.

An example of one such arrangement is shown in DL frame 300t. DL frame 300t may include a Physical Downlink Control Channel (PDCCH) symbol 301, which may include downlink control information, for example, resource assignments, grant information, operation parameters, and/or the like. PDSCH group Y 302t−1 is arranged after PDCCH 301. PDSCH group Y 302t−1 is the PDSCH group Y of previous frame 300t−1, which was strategically delayed and transmitted within current DL frame 300t for reasons that will be explained below. After PDSCH group Z 302t−1, is Demodulation Reference Signal (DMRS) 303t, which includes pilot information and demodulation information used to decode symbols that follow DMRS 303t.

After DMRS 303t is PDSCH group X 304t, which comprises PDSCH symbols $304^a t$-$304^n t$. DMRS 303t is located before PDSCH group X 304t because DMRS 303t comprises information that the processor uses to process PDSCH group X 304t. Further, PDSCH group X 304t is arranged closely after DMRS 303t in order to increase the amount of time that the receiver processor has to process as many of the PDSCH symbols $304^a t$-$304^n t$ of PDSCH group X 304t as possible (e.g., preferably all the PDSCH group X's 304t symbols). As the PDSCH symbols of PDSCH group X 304t are decoded, the receiving processor can begin generating Ack/Nack information for the PDSCHs symbols of PDSCH group X 304t. In this example, current DL frame 300t has three times slots (e.g., PDSCH symbol $305^a t$, PDSCH symbol $305^n t$, and G 306t) available after PDSCH symbol $304^n t$ and before Ack/Nack symbol 307t is scheduled for transmission. As such, the receiving processor has at least three time slots worth of time to generate Ack/Nack information for the symbols of PDSCH group X 304t. This is far more time than in conventional systems, wherein the receiving processor only had a single time slot (e.g., the time slot for time gap G) within which to generate and transmit an Ack/Nack message. With this additional time to generate Ack/Nack information for PDSCH group X 304t, the RX processor 258 has a much higher likelihood of fully processing PDSCH group X 304t within the current frame.

PDSCH group Y 305t is placed after PDSCH group X's 304t in current DL frame 300t. PDSCH group Y 305t comprises PDSCH symbol $305^a t$ through PDSCH symbol $305^n t$. After PDSCH group Y 305t is time gap (G) 306t, which is the time gap factored into the frame to give the receiving processor time to process contents of the frame and generate Ack/Nack information. After G 306t, the receiving processor transmits back to the transmitting processor Ack/Nack 307t, which indicates the success and/or failure of the receiving processor's attempt to decode at least PDSCH group X 304t. Ack/Nack 307t may indicate the receiving processor's success and/or failure regarding each individual symbol of PDSCH group X 304t (e.g., PDSCH symbols $304^a t$-$304^n t$). Additionally and/or alternatively, Ack/Nack 307t may indicate the receiving processor's success and/or failure regarding PDSCH group X 304t as a whole regardless of the processing success of the individual symbols therein. After Ack/Nack 307t is received by the transmitter, the transmitting processor has a short gap of time G' 308t before which the transmitter is scheduled to start transmitting successor DL frame 300t+1. G' allows a short amount of processing time for transmitting processor to prepare the beginning of successor DL frame 300t+1.

Returning to Ack/Nack 307t, the receiving processor may choose to omit information regarding the processing success and/or failure of PDSCH group Y 302t from Ack/Nack 307t. In this example, PDSCH group Y 302t is located in the time slots directly before G 307t. As such, the receiving processor has less time to process PDSCH group Y 305t as compared to the time the receiving processor had to process PDSCH group X 304t. Due to this shortage of time, the receiving processor may choose to generate and create the Ack/Nack information for PDSCH group Y 305t after Ack/Nack message 307t is transmitted. If the receiving processor chooses to delay the generation of the Ack/Nack information regarding PDSCH group Y 305t in order to give the receiving processor more time to process the symbols therein, then the receiving processor may choose to delay transmission of the PDSCH group Y's 305t Ack/Nack information until the Ack/Nack symbol of successor DL frame 300t+1. In this example, choosing to delay transmission of PDSCH group Y's 305t Ack/Nack information until transmission of Ack/Nack symbol 307t+1 gives the receiving processor at least fifteen additional time slots within which the receiving processor can process PDSCH group Y 305t and generate its corresponding Ack/Nack information. Being that PDSCH group Y 305t was previously identified as including information of a type that is not time pertinent (e.g., non-highest priority), delaying processing of the symbols by one or more frame is inconsequential to the overall operation of the system. This is an example of a way that selectively arranging the symbols within the frames gives the receiving processor more time to process the symbols of the frames in a manner that does not increase G and does not harm the overall throughput of the system.

Another way that strategically arranging the symbols within the frames gives the receiving processor and the transmitting processor more time to process the symbols of the frames involves PDSCH group Z 302t. In this example, the transmitting processor 230 identified PDSCH group Z 302t as including less pertinent information, and as such, delaying transmission of the symbols therein is inconsequential to the overall operation of the system. When constructing current DL frame 300t, the transmission processor delays transmission of PDSCH group Z 302t and includes the symbols within successor DL frame 300t+1. By delaying transmission of PDSCH group Z 302t, the transmitting processor gives itself additional time to determine what data will be transmitted within the symbols of PDSCH group Z 302t, additional time to generate the symbols of PDSCH group Z 302t, and additional time to transmit the symbols of PDSCH group Z 302t. Further, when the transmitting processor constructs successor DL frame 300t+1, the transmitting processor strategically arranges PDSCH group Z 302t (e.g. PDSCH symbol $302^a t$-PDSCH symbol $302^a n$) behind PDCCH 301t+1 and in front of DMRS 303t+1. PDSCH group Z 302t was originally constructed to be demodulated according to information within DMRS 303t. Once PDSCH group Z 302t is received by the receiving processor, the receiving processor will have already processed DMRS 303t. As such, the receiving processor is able to quickly decode PDSCH group Z 302t using information from DMRS 303t upon its delayed arrival because the PDSCH group Z's 302t corresponding DMRS information has already been processed. This leads to quick processing of PDSCH group Z 302t. Further, as soon as symbols of PDSCH group Z 302t are processing, receiving processor may begin generating Ack/Nack information for PDSCH group Z 302t. Since PDSCH group Z 302t is processed so early within successor DL frame 300t+1 and the corresponding Ack/Nack generation is started so early within successor DL frame 300t+1, the receiving processor has at least nine time slots within which to complete the previous processing (e.g., time slots DMRS 303t+1, PDSCH symbol X $304^a t$+1 through PDSCH symbol X $304^n t$+1, and G 306t+1). After PDSCH group Z 302t, successor DL frame 300t+1 includes DMRS 303t+1, which comprises pilot information and demodulation information used to decode symbols that follow DMRS 303t+1. With the information from DMRS 303t+1 now available, the receiving processor processes PDSCH group X 304t+1 and begins generating Ack/Nack information for the symbols of PDSCH group X 304t+1 similar to the description above regarding PDSCH group X 304t.

After PDSCH group X 304t+1 of successor DL frame 300t+1, the transmitting processor arranges PDSCH group Y 305t+1. The receiving processor may take additional time processing PDSCH group Y 305t+1 and generating its corresponding Ack/Nack information because the receiving processor may, if desired, delay sending PDSCH group Y's 305t+1 Ack/Nack information until Ack/Nack 307t+2 (not shown). The receiving processor may choose to delay the processing of PDSCH group Y 305t+1 and the generation PDSCH group Y's 305t+1 Ack/Nack information in order to give itself more time to complete the processing and generation similar to that of PDSCH group Y 305t discussed above. Because PDSCH group Y 305t+1 was previous identified as including information of a type that is not time pertinent, delaying processing of the symbols by one or more frame is inconsequential to the overall operation of the system.

After the processing time gap G 306t+1, the receiving processor generates Ack/Nack symbol 307t+1. In this example, the Ack/Nack information corresponding to PDSCH group Y 305t was not sent within Ack/Nack 307t. As such, the receiving processor sends the Ack/Nack information corresponding to PDSCH group Y 305t within Ack/Nack 307t+1. Further, by this time, PDSCH group X 304t+1 has been fully processed by the receiving processor and its Ack/Nack information has been generated. As such, the Ack/Nack information corresponding to PDSCH group X 304t+1 will also be sent back to the transmitting processor within Ack/Nack 307t+1. For example, Ack/Nack 307t+1 may include Ack/Nack information regarding PDSCH group Y 305t and Ack/Nack information regarding PDSCH group X 304t+1. After Ack/Nack 307t+1 is transmitted, a small gap of time G' 308t+1 lapses while the transmitting processor prepares to send the next successor DL frame (not shown) and the receiving processor prepares to receive the next successor DL frame (not shown).

Similar to the description above, the receiving processor may choose to omit information regarding the processing success and/or failure of PDSCH group Y 302t+1 from Ack/Nack 307t+1. As explained above, PDSCH group Y 302t+1 is located in the time slots directly before G 207t+1. As such, the receiving processor has less time to process PDSCH group Y 305t+1 as compared to the time the receiving processor has to process PDSCH group X 304t+1. Similar to above, due to this shortage of time, the receiving processor may choose to generate and create the Ack/Nack information for PDSCH group Y 305t+1 after Ack/Nack message 307t+1 is generated and transmitted. If the receiving processor chooses to delay the generation of the Ack/Nack information regarding PDSCH group Y 305t+1 in order to give the receiving processor more time to process the symbols therein, then the receiving processor may choose to delay transmission of the PDSCH group Y's 305t+1 Ack/Nack information until the next successor DL frame 300t+2 (not shown).

In this example, choosing to delay transmission of PDSCH group Y's 305t+1 Ack/Nack information until transmission of Ack/Nack symbol 307t+2 (not shown) gives the receiving processor additional time slots within which the receiving processor can process PDSCH group Y 305t+1 and generate its corresponding Ack/Nack information. Being that PDSCH group Y 305t+1 was previously identified as including information of a type that is not time pertinent, delaying processing of the symbols by one or more frame is inconsequential to the overall operation of the system.

Also similar to above, the transmitting processor identified PDSCH group Z 302t+1 as including less pertinent information, and as such, delaying transmission of the symbols therein is inconsequential to the overall operation of the system. When constructing successor DL frame 300t+1, the transmitting processor delays transmission of PDSCH group Z 302t+1 until the next successor DL frame 300t+2 (not shown). When constructing the next successor DL frame 300t+2 (not shown), the transmitting processor strategically arranges PDSCH group Z 302t+1 (e.g. PDSCH symbol 302″t+1 through PDSCH symbol 302″t+1) in front of DMRS 303t+2 (not shown). PDSCH group Z 302t+1 was originally constructed to be demodulated according to information within DMRS 303t+1. As such, when PDSCH group Z 302t+1 is received by the receiving processor, the receiving processor will have already processed DMRS 303t+1. Thus, the receiving processor is able to quickly decode PDSCH group Z 302t+1 upon its delayed arrival because the PDSCH group Z's 302t+1 demodulation information has already been processed. Similar to the above, after PDSCH group Z 302t+1, the next successor DL frame 300t+2 (not shown) includes DMRS 303t+2 (not shown), which includes demodulation information used to demodulate symbols that follow DMRS 303t+2 (not shown). With the information from DMRS 303t+2 (not shown) available, the receiving processor processes the symbols thereafter in a manner similar to that described above.

Returning now to current DL frame 300t, the transmitting processor placed PDSCH group Z 302t−1 after PDCCH 301. PDSCH group Z 302t−1 is the PDSCH group Z of previous frame 300t−1. PDSCH group Z was strategically delayed and transmitted within current DL frame 300t because the transmitting processor decided that the receiving processor may lack sufficient time to process PDSCH group Z 302t−1 and generate its corresponding Ack/Nack information prior to the receiving processor being scheduled to send Ack/Nack symbol 307t−1. Further, the transmitting processor may have decided to delay transmission of PDSCH group Z 302t−1 in order to give itself additional time to determine which data will be included within the PDSCHs, generate the PDSCHs, and transmit the PDSCHs. As mentioned above, PDSCH group Z 302t−1 is placed within present DL frame 300t prior to DMRS 303t. As such, PDSCH group Z 302t−1 is decoded using information from DMRS 303t−1, which quickens the processing of PDSCH group Z 302t−1 because the receiving processor has already decoded the information from DMRS 303t−1. Once PDSCH group Z 302t−1 is processed, the receiving processor generates the corresponding Ack/Nack information, and includes PDSCH group Z's 302t−1 Ack/Nack information within Ack/Nack 307t. As such, Ack/Nack 307t may comprise PDSCH group Z's 302t−1 Ack/Nack information and PDSCH group X's 304t Ack/Nack information.

Being that PDSCH group Z 302t−1 was previous identified as including information of a type that is not time pertinent, delaying processing of the symbols by one or more frame is inconsequential to the overall operation of the system. In light of the above, one can see how previous DL frame 300t−1 was selectively arranged by the transmitting processor including: PDCCH 301t−1, PDSCH group Z 302t−2 (PDSCH symbol 302″t−2 through PDSCH symbol 302″t−2), DMRS 303t−1, PDSCH group X 304t−1 (PDSCH symbol 304″t−1 through PDSCH symbol 304″t−1), PDSCH group Y 305t−1 (PDSCH symbol 305″t−1 through PDSCH symbol 305″t−1), G 306t−1, Ack/Nack 307t−1, G' 308t−1, as well as additional previous DL frames and additional successor DL frames. This example selective arrangement of data within the frames give the processor more time to process the symbols of the frame in a manner that does not increase time gap G or G', does not increase length (e.g., timespan) of the overall frame, and does not the harm the overall throughput of the system.

Figure 3C:
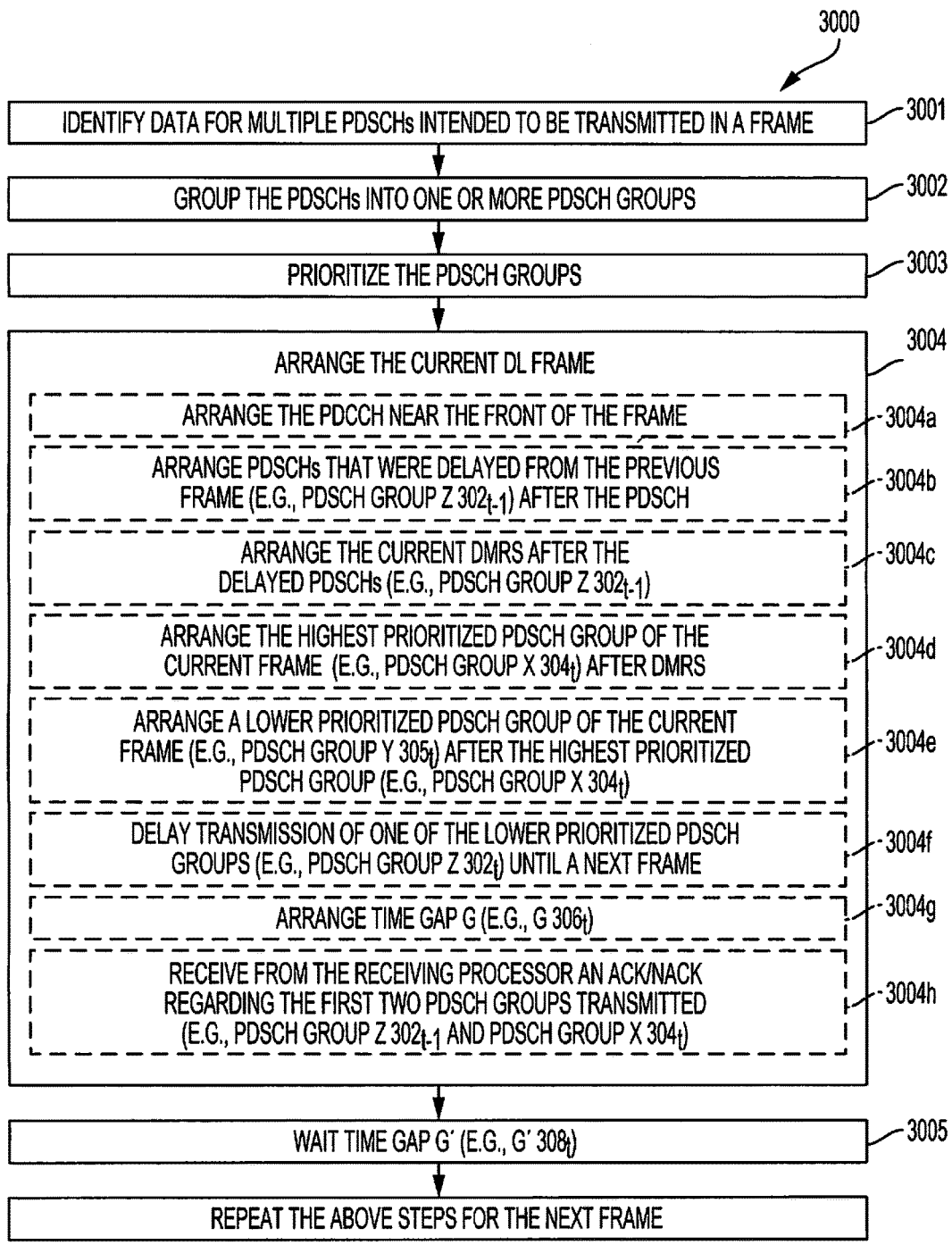
FIG. 3c is an example method of arranging the example three DL frames of FIG. 3b.

FIG. 3c illustrates an example method 3000, which selectively arranges the symbols of one or more frames. In step 3001, the transmitting processor 230 identifies data intended to be transmitted on multiple PDSCHs in a frame. In step 3002, the transmitting processor 230 groups the PDSCHs into one or more groups. In step 3003, the transmitting processor 230 prioritizes the PDSCH groups. In this example, PDSCH group X 304t is given the highest priority rating because the transmitting processor 230 would preferably receive Ack/Nack information for the PDSCH group X 304t within a single frame, and PDSCH group Y 305t and PDSCH group Z 302t are given a non-highest priority rating because receiving Ack/Nack information for these groups within a single frame is comparatively less important. In step 3004, a processor arranges the order of the current DL frame. In step 3004a, a processor arranges the PDCCH near the beginning of the frame. In step 3004b, the processor arranges PDSCH(s) that were delayed from transmission in a previous frame (e.g., PDSCH group Z 302t−1) after the PDCCH. In step 3004c, the processor arranges the current DMRS (e.g., DMRS 303t) after the delayed PDSCHs (e.g., PDSCH group Z 302t−1). In step 3004d, the processor arranges the PDSCH group of the frame, which is comparatively more important (e.g., PDSCH group X 304t) than the other PDSCH groups of the frame after the DMRS of the current frame (e.g., DMRS 303t). In step 3004e, the processor arranges a PDSCH group of the current frame that is comparatively less important (e.g., PDSCH Y 305t) after the comparatively more important PDSCH group (e.g., PDSCH group X 304t). In step 3004f, the processor selects another PDSCH group of the current frame that is comparatively less important (e.g., PDSCH Z 302t) and delays transmission of the PDSCH group until a successor DL frame. In step 3004g, the processor arranges the time gap G. In step 3004h, the processor receives from a receiver an Ack/Nack regarding some of the PDSCH groups that were transmitted within the DL frame (e.g., PDSCH group Z 302t−1 and PDSCH group X 304t). In step 3005, time gap G' occurs, wherein the processor is preparing the next frame (e.g., successor DL frame 300t+1). Thereafter, the steps are repeated for the next DL frame.

Figure 4A:
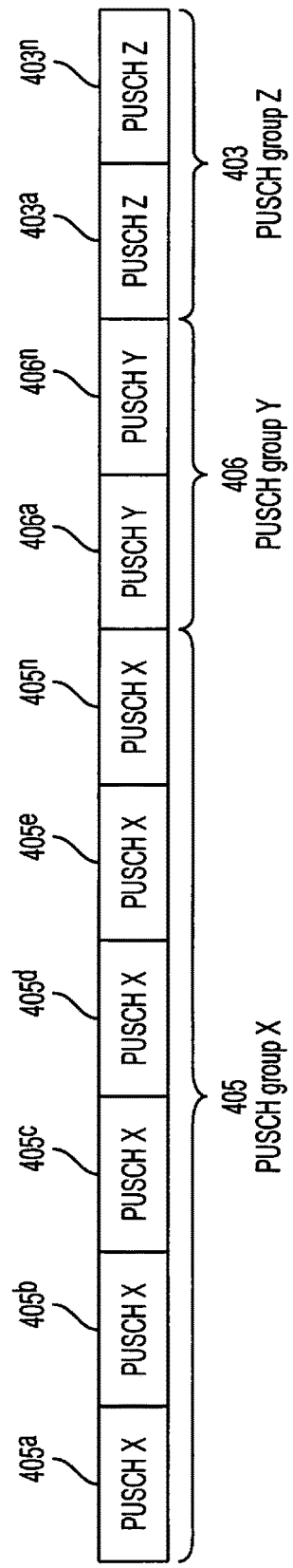
FIG. 4a is an example of a plurality of Physical Uplink Shared Channel (PUSCH) symbols, which are to be uplinked according to some embodiments.

FIG. 4a illustrates an example of sending data on a plurality of Physical Uplink Shared Channels (PUSCH) (e.g., $403^a$-$403^n$, $405^a$-$405^n$, and $406^a$-$406^n$) that are intended for incorporation into an UL frame 400 being generated by a transmitting processor. A PUSCH may be used to transmit a plethora of different information that may or may not be time pertinent. For example, a PUSCH may include time pertinent user data (e.g., streaming video, telephone calls, website data, SMS messages, etc.), and/or a PUSCH may include sideband data and/or control information (e.g., Multiple In Multiple Out (MIMO)) parameters, signaling messages, search reports, measurements, interference measurement, etc.) that is comparatively less time pertinent. Further, if desired, a PUSCH may merely be a place holder (e.g., carry no information or useless information) and therefore be less pertinent.

In a frame, PUSCHs may be grouped into n number of groups. For the sake of clarity, the groups are referred to as PUSCH groups. For example, the PUSCHs intended for UL frame 400 are grouped into three PUSCH groups: PUSCH group X 405, PUSCH group Y 406, and PUSCH group Z 403. In embodiments, a PUSCH group may be selected based on the type of information within the PUSCH. For example, PUSCHs comprising time pertinent information may be grouped together into one or more PUSCH groups, and PUSCHs comprising non-time pertinent information may be grouped together into one or more PUSCH groups. In another example, PUSCHs comprising telephone calls may be grouped together into one or more PUSCH groups while PUSCHs comprising control information may be grouped together into one or more PUSCH groups. In yet another example, PUSCHs comprising information that a provider, customer, user, etc. has paid a premium for may be grouped together into one or more PUSCH groups, while PUSCHs comprising information for which no premium has been paid may be grouped together into one or more PUSCH groups.

Regardless of the method used to group the PUSCH groups, the transmitting processor 264 may determine that one or more of the PUSCH groups include information that the transmitting processor 264 would prefer to be fully processed with a single frame. Further, the transmitting processor 264 may determine that others of the PUSCH groups include information of the type that processing during a single frame is less important. The transmitting processor 264 may prioritize the PUSCH groups wherein one or more of the PUSCH groups are a highest priority, a middle priority, a lower priority, a lowest priority, etc. Further, the PUSCH groups may be prioritized as highest priority and non-highest priority. For example, the transmitting processor 264 may prioritize PUSCH groups including user data (e.g., streaming video, telephone calls, website data, SMS messages, etc.) as the highest and/or higher priority and prioritize PDSCH groups including sideband data as lowest and/or lower priority. In FIG. 4a, the PUSCH groups are organized such that: PUSCH group X 405 comprises PUSCH symbol X $405^a$ through PUSCH symbol X $405^n$; PUSCH group Y 406 comprises PUSCH symbol Y $406^a$ through PUSCH symbol Y $406^n$; and PUSCH group Z 403 comprises PUSCH symbol Z $403^a$ through PUSCH symbol Z $403^n$. In this example, the processor determined that preferably Ack/Nack information regarding PUSCH group X 405 (e.g., user data) should be received within a single frame while Ack/Nack information regarding PUSCH group Y 406 and PUSCH group Z 406 (e.g., less pertinent user data and/or sideband data) may be received over multiple frames with inconsequential effect to the system.

Figure 4B:
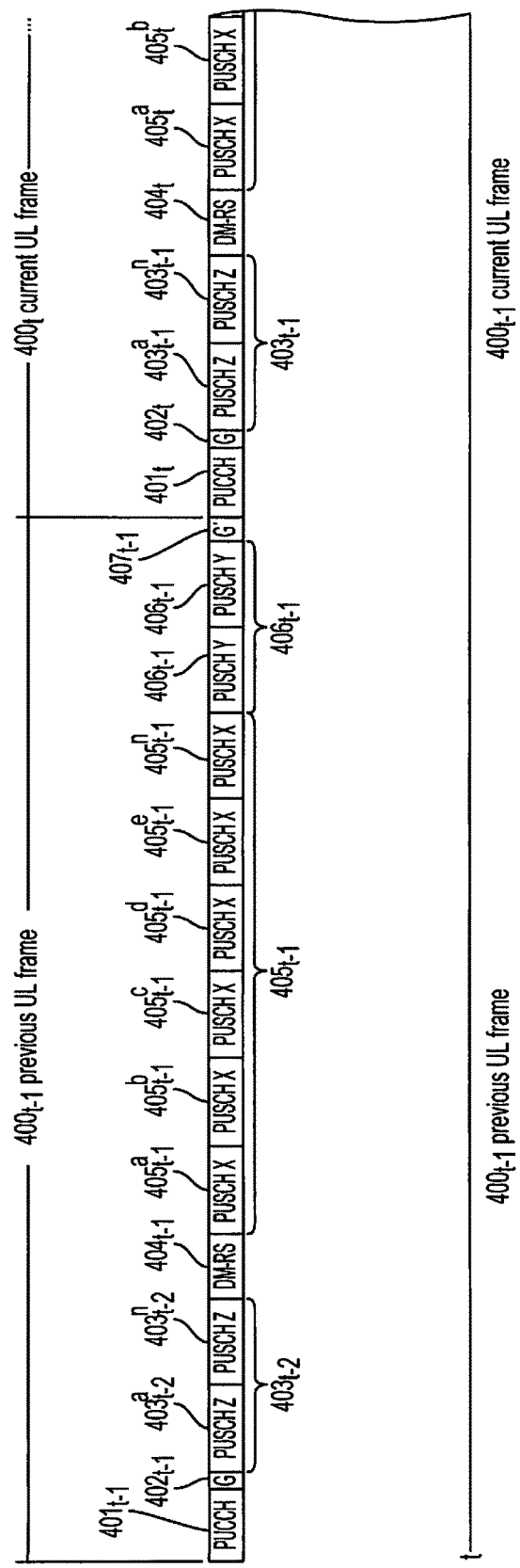
FIG. 4b is an example of three UL frames according to some embodiments.
Figure 4B:
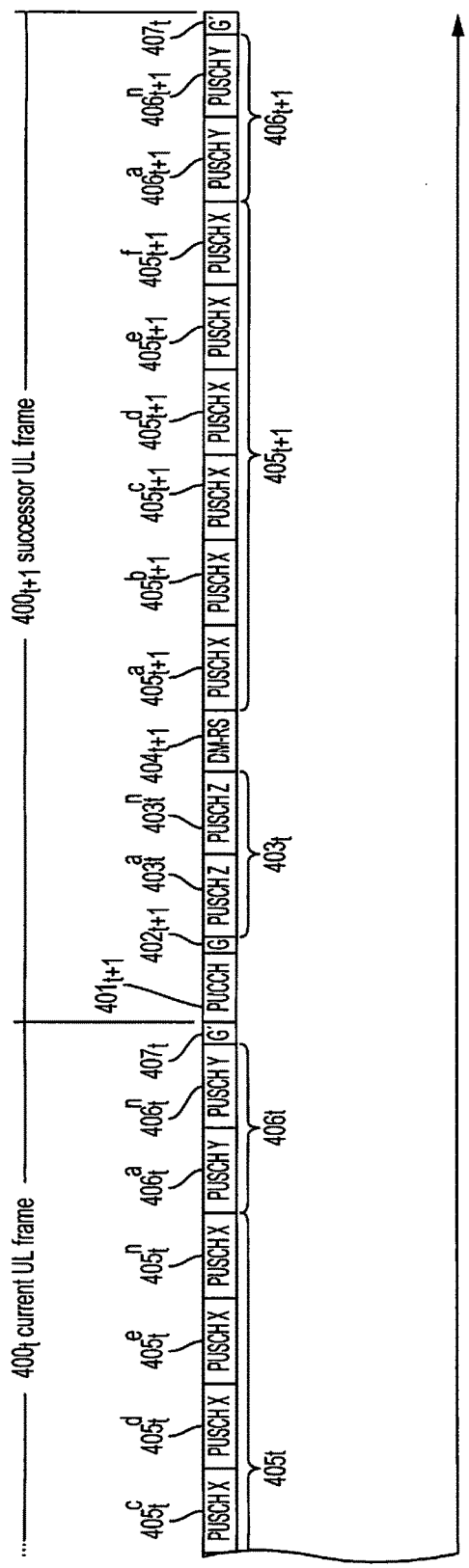
Figure 4C:
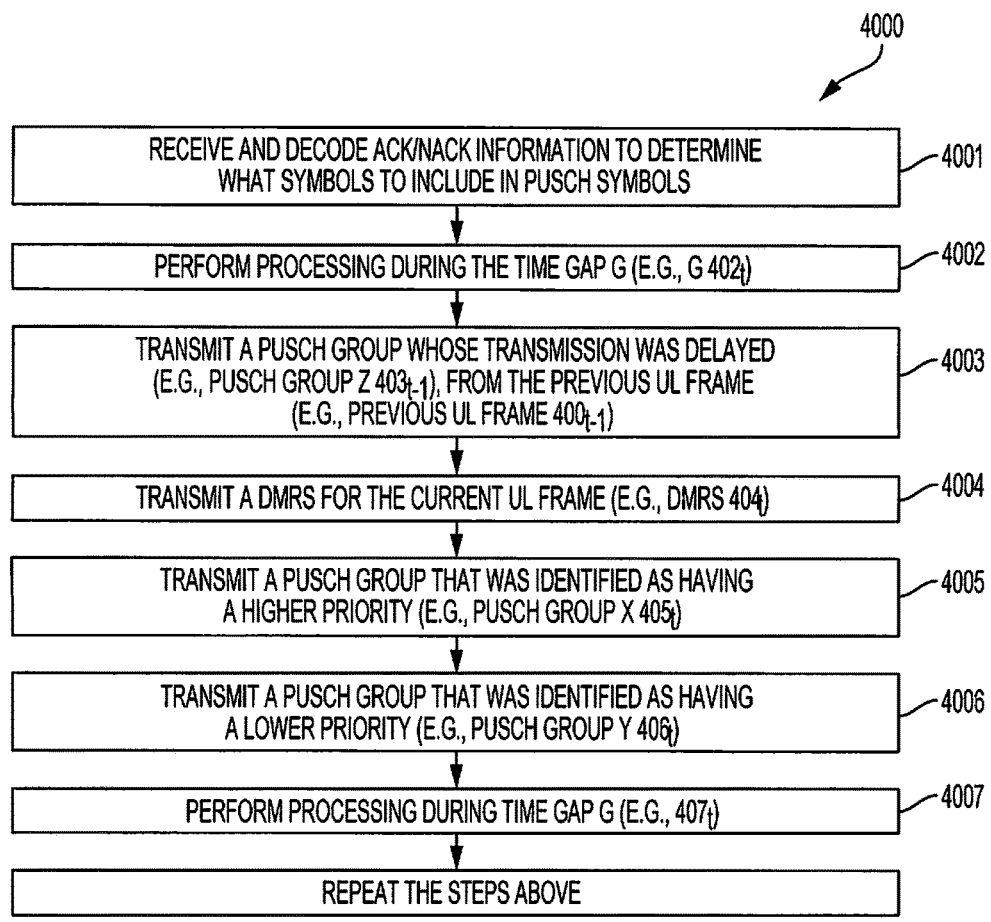
FIG. 4c is an example method of arranging the example three UL frames of FIG. 4b according to some embodiments.

When the transmitting processor (e.g., TX processor 264) constructs an UL frame for transmission, the groups of PUSCH symbols are selectively arranged within one or more frames. Arrangement can be done in such a way that gives the transmitting processor 264 appropriate time to generate the frame and gives the receiving processor 238 appropriate time to process the PUSCH symbols and generate Ack/Nack information for each group of PUSCH symbols without increasing the G period of time. Again, this leads to better utilization of the frame because data determined to be of high priority is processed within a single frame while data determined to be of less priority is processed thereafter in one or more frames. FIG. 4b illustrates one of multiple ways the transmitting processor 264 may arrange information within one or more frames in order to better utilize the frame.

FIG. 4b shows three example UL frames illustrated with respect to time: previous UL frame 400t−1, current UL frame 400t, and successor UL frame 400t+1, each of which may be generated, transmitted, received, and processed by the methods, systems, and/or devices described herein. In this example, the present time is represented as t. As such, previous UL frame 400t−1 was generated, transmitted, received, and processed in the past (e.g., t−1), current UL frame 400t is currently being generated, transmitted, received, and processed (e.g., t), and successor UL frame 400t+1 will be the next frame to be generated, transmitted, received, and processed (e.g., t+1).

This example will start with current UL frame 400t. In this embodiment, the system prefers that Ack/Nack information regarding PUSCH group X 405t be fully processed within the length of a single frame. Further, the system determined that receiving Ack/Nack information regarding PUSCH group Y 406t and/or PUSCH group Z 403t within a single frame is of less importance. With the PUSCH groups partitioned and the pertinence of their timing established, the transmitting processor strategically arranges the PUSCH symbols within one or more frames in such a way that gives the transmitting processor more time generate the current UL frame 400t and the receiving processor more time to process current UL frame 400t.

Current UL frame 400t shows an example arrangement of the symbols therein. Current UL frame 400t may include a Physical Uplink Control Channel (PUCCH) symbol 401. The PUCCH 401 may include uplink control information, for example, resource assignments, grant information, operation parameters, Ack/Nack information, and/or the like. Ack/Nack information indicates whether or not symbols from previous UL frame 400t−1 were successfully received by the receiving processor. The Ack/Nack information could potentially be included on another physical channel of the frame but preferably is included on a physical channel near the beginning of the frame. If one or more symbols of previous UL frame 400t−1 failed to be received, then the Ack/Nack information may indicate which of the symbols need to be retransmitted. In embodiments, the Ack/Nack information may indicate successes and/or failures on a per-symbol basis. Additionally and/or alternatively, the Ack/Nack information may indicate whether an entire PUSCH group (e.g. PUSCH group X 405t−1) succeeded or failed regardless of the success and/or failure of the individual symbols therein.

If the current UL frame 400t includes Nack information, then the transmitting processor determines which symbols should be retransmitted and begins reprocessing the failed symbols in order to retransmit the data. If the current UL frame includes no Nack information, then the transmitting processor will begin processing new data for transmission on PUSCHs. Of course, the various PUSCHs may include a mixture of retransmitted and new data depending on the indications of the Ack/Nack information. Prior to the PUSCHs of current UL frame 400$t$, the processor includes a time gap (G) 402$t$, which is a gap of time that gives the transmitting processor some time to determine which symbols will be transmitted on the PUSCHs, to process the determined symbols, and to generate the UL frame or frames to send the symbols to the receiving processor. As can be seen, G 402$t$ is a small amount of time (e.g., one time slot), and G 402$t$ may not give transmitting processors enough time to accomplish all of the above listed tasks. As such, the transmitting processor strategically arranges the symbols within one or more UL frames to give the transmitting processor more time to process the symbols of the UL frame in a manner that does not increase G and does not harm the overall throughput of the system.

In current UL frame 400$t$, the transmitting processor positions PUSCH group Z 403$t$-1 after G 402$t$. The reasoning for positioning this particular PUSCH group in this location will be discussed in more detail below. After PUSCH group Z 403$t$-1, the transmitting processor places DMRS 404$t$, which includes pilot information and demodulation information used by the receiving processor to decode symbols that follow DMRS 404$t$.

After DMRS 404$t$, the processor arranges PUSCH group X 405$t$, which comprises PUSCH symbols 405$^a$$t$-405$^n$$t$. DMRS 404$t$ is placed before PUSCH group X 405$t$ because DMRS 404$t$ includes information that is helpful to the receiving processor when processing PUSCH group X 405$t$. As such, it is convenient to provide DMRS 404$t$ to the receiving processor prior to providing PUSCH group X 405$t$. Further, due to the strategic placements of DMRS 404$t$ and PUSCH symbols 405$^a$$t$-405$^n$$t$, the transmitting processor has additional time to generate PUSCH group X 405$t$ as compared to traditional systems. Specifically, after the transmitting processor receives the Ack/Nack information near the beginning of the UL frame, the transmitting processor has at least three time slots (e.g., G 402$t$ and PUSCH symbol 403$^a$$t$-1 through PUSCH symbol 402$^n$$t$-1) before it is scheduled to transmit DMRS 404$t$ and at least four time slots (e.g., G 402$t$, PUSCH symbol 403$^a$$t$-1, PUSCH symbol 402$^n$$t$-1, and DMRS 404$t$) before it is scheduled to begin transmitting PUSCH group X 405$t$. In comparison, conventional transmitting processors only have one time slot (e.g., G) before it is scheduled to transmit a DMRS and only has two time slots (e.g., G and DMRS) before it is scheduled to begin transmitting PUSCH symbols. Accordingly, the purposeful arrangement of current UL frame 400$t$ gives the transmitting processor additional time to determine which symbols will be transmitted in PUSCH group X 405$t$ and additional time to process the determined symbols thereby greatly increasing the likelihood that PUSCH group X 405$t$ will be successfully transmitted within a single frame.

After PUSCH group X 405$t$, the transmitting processor places PUSCH group Y 406$t$ (e.g., PUSCH symbol 400 through PUSCH symbol 400). Similar to PUSCH group X 405, the transmitting processor determines which data will be transmitted within PUSCH group Y 406 based at least in part on information within the received Ack/Nack. For example, the transmitting processor may determine whether PUSCH group Y 406$t$ will retransmit data that was previously transmitted but received in error or whether PUSCH group Y 406$t$ will transmit new data. With the strategic arrangement of current UL frame 400$t$, PUSCH group Y 406$t$ is scheduled to begin transmitting at least ten time slots (e.g., G 402$t$, PUSCH Z 403$^a$$t$-1, PUSCH Z 403$^n$$t$-1, DMRS 404$t$, and PUSCH X 405$^a$$t$ through PUSCH X 405$^n$$t$) after PUCCH 401$t$. As such, the transmitting processor has additional time to determine which symbols will be transmitted in the PUSCH group Y 406$t$ and additional time to process the determined symbols.

As shown in FIG. 4$a$, the PUSCH symbols of the frame of this example include a third group, PUSCH group Z 403$t$. However, given the amount of time it may take the transmitting processor to determine which symbols will be transmitted in PUSCH group X 405$t$ and PUSCH group Y 406$t$, to process the determined symbols, and to generate and transmit PUSCH group X 405$t$ and PUSCH group Y 406$t$, it is unlikely that the transmitting processor will successfully perform the above listed tasks for PUSCH group Z 403$t$ within the time allotted for current UL frame 400$t$. As such, to give the transmitting processor additional time to determine which symbols will be transmitted in PUSCH group Z 403$t$, to process the determined symbols, and to generate and transmit PUSCH group Z 403$t$, the transmitting processor may decide to delay the processing, generation, and transmission of PUSCH group Z 403$t$. In the present example, the transmitting processor decides to schedule PUSCH group Z 403$t$ to be transmitted during successor UL frame 400$t$+1. Delaying transmission of the symbols gives the transmitting processor at least an additional three time slots (e.g., G' 407$t$, PUCCH 401$t$+1, and G 402$t$+1) within which the transmitting processor can perform the operations of determining which symbols will be transmitted in PUSCH group Z 403$t$ and processing the determined symbols. Further, as explained above, the system previously determined that PUSCH group Z 403$t$ includes information that is less time pertinent as compared to PUSCH group X 405$t$; thus, delaying transmission of the symbols by one or more frame is inconsequential to the overall operation of the system.

After transmission of the last symbol of current UL frame 400$t$, there is a small gap G' 407$t$ of time, wherein the transmitting processor is preparing the next UL frame. In this example, the next UL frame is successor UL frame 400$t$+1. Successor UL frame 400$t$+1 includes Ack/Nack information from the receiving processor, which indicates whether some or all of the symbols of current UL frame 400$t$ were successfully received. In embodiments, the Ack/Nack information may be included within PUCCH 401$t$+1. After the Ack/Nack information, the transmitting processor arranges G 402$t$+1, which is a gap of time that gives processing time for the processors. After G 402$t$+1, the transmitting processor arranges PUSCH group Z 403$t$ (which had been delayed from current UL frame 400$t$) into successor UL frame 400$t$+1. At this point in time, PUSCH group Z 403$t$ will be ready for transmission because, as explained above, transmission of PUSCH group Z 403$t$ was purposefully delayed to provide additional time to the transmitting processor to process and generate the symbols of PUSCH group Z 403$t$.

After PUSCH group Z 403$t$, the transmitting processor places DMRS 404$t$+1. The transmitting processor will have plenty time to generate and transmit DMRS 404$t$+1 according to this placement because three additional time slots (e.g., G 402$t$+1, PUSCH Z 403$^a$$t$, and PUSCH Z 403$^n$) provide the transmitting processor with additional time to generate DMRS 404$t$+1.

After DMRS 404$t$+1, PUSCH group X 405$t$+1 (e.g., PUSCH symbol X 405$^n$$t$+1 through PUSCH symbol X 405$^n$$t$+1) are placed into successor UL frame 400$t$+1. The transmitting processor will have plenty of time to generate and transmit PUSCH group X 405$t$+1 because upon receiving the Ack/Nack information, the uplink transmitting processor may begin the process of determining what symbols will be included in PUSCH group X 405$t$+1 (e.g., symbols that should be retransmitted and/or new symbols) and generating the symbols. Because the transmitting processor may begin this process upon receiving the Ack/Nack information, the transmitting processor has at least four time slots (e.g., G 402$t$+1, PUSCH Z 403$^a t$ through PUSCH Z 403$^n$, and DMRS 404$t$+1) worth of time to complete this process for PUSCH symbol X 405$^a t$+1, at least five time slots (e.g., G 402$t$+1, PUSCH Z 403$^a t$ through PUSCH Z 403$^n$, DMRS 404$t$+1, and PUSCH symbol X 405$^a t$+1) worth of time to complete this process for PUSCH symbol X 405$^b t$+1, and at least nine time slots worth of time to complete this process for PUSCH symbol X 405$^n t$+1. This arrangement of successor UL frame 400$t$+1 provides the transmitting processor with enough additional time to ensure that all the symbols of PUSCH group X 405$t$+1 are transmitted within a single frame.

After PUSCH group X 405$t$+1, the transmitting processor schedules PUSCH group Y 406$t$+1 within the frame. For reasons similar to that of PUSCH group Y 406$t$, which is described above, the transmitting processor has sufficient time to ensure that the symbols of PUSCH group Y 406$t$+1 are transmitted within a single frame.

Similar to that of current UL frame 400$t$, the original group of PUSCH symbols intended for successor UL frame 400$t$+1 included a third group, PUSCH group Z 403$t$+1. However, given the amount of time it may take for the transmitting processor to determine which symbols will be transmitted in PUSCH group X 405$t$+1 and PUSCH group Y 406$t$+1, to process the determined symbols, and to generate and transmit PUSCH group X 405$t$+1 and PUSCH group Y 406$t$+1, it is unlikely that the transmitting processor will successfully perform the above listed tasks for PUSCH group Z 403$t$+1 within the time allotted for successor UL frame 400$t$+1. As such, to give the transmitting processor additional time to determine which symbols will be transmitted in PUSCH group Z 403$t$+1, to process the determined symbols, and to generate and transmit PUSCH group Z 403$t$+1, the transmitting processor may decide to delay the processing, generation, and transmission of PUSCH group Z 403$t$+1. In the present example, the transmitting processor decides to schedule PUSCH group Z 403$t$+1 to be transmitted during the next successor UL frame 400$t$+2 (not shown). Delaying transmission of the symbols gives the transmitting processor at least an additional three time slots (e.g., G' 407$t$+1, PUCCH 401$t$+2 (not shown), and G 402$t$+2 (not shown)) within which the transmitting processor can perform the operations of determining which symbols will be transmitted in PUSCH group Z 403$t$+1, processing the determined symbols, and transmitting PUSCH group Z 403$t$+1. Further, as explained above, the system previously determined that PUSCH group Z 403$t$+1 includes information that is less time pertinent as compared to PUSCH group X 405$t$+1; thus, delaying transmission of the symbols by a one or more frame is inconsequential to the overall operation of the system.

Returning now to current UL frame 400$t$, after PUCCH 401$t$ and G 402$t$, the transmitting processor placed PUSCH group Z 403$t$−1. PUSCH group Z 403$t$−1 is the PUSCH group Z of previous UL frame 400$t$−1. One reason PUSCH group Z 403$t$−1 was strategically delayed and transmitted within current UL frame 400$t$ may be because the transmitting processor decided that the receiving processor may lack sufficient time to process PUSCH group Z 403$t$−1 and generate its corresponding Ack/Nack information prior to the receiving processor being scheduled to send Ack/Nack information within PUCCH 401$t$. Thus, by delaying transmission of PUSCH group Z 403$t$−1, the transmitting processor is giving the receiving processor additional time to process the data included. Further, the PUSCH group Z 403$t$−1 may have been strategically delayed and transmitted within current UL frame 400$t$ because the transmitting processor decided that the transmitting processor was unable to complete all the tasks of: determining which symbols will be transmitted in PUSCH group Z 403$t$−1, processing the determined symbols, and transmitting PUSCH group Z 403$t$−1, within the time allotted for previous UL frame 400$t$−1. For these and/or additional reasons, the transmitting processor arranges current UL frame 400$t$ such that PUSCH group Z 403$t$−1 (e.g., PUSCH symbol Z 403$^a t$−1 through PUSCH symbol Z 403$^n t$−1) is positioned after PUCCH 401$t$ and G 402$t$ but before DMRS 404$t$.

As mentioned above, PUSCH group Z 403$t$−1 is placed within present UL frame 400$t$ prior to DMRS 404$t$. As such, PUSCH group Z 403$t$−1 is decoded using information from the previous DMRS, e.g., DMRS 404$t$−1. Such a result is desirable because PUSCH group Z 403$t$−1 was originally intended to be processed according to the information provided in DMRS 404$t$−1. As such, the transmitting processor does not have to wait for the processing of a new DMRS before beginning to process PUSCH group Z 403$t$−1. Further, positioning PUSCH group Z 403$t$−1 prior to DMRS 404$t$ provides the receiving processing with additional time to decode and otherwise process PUSCH group Z 403$t$−1 upon receipt. Specifically, when the receiving processor receives PUSCH group Z 403$t$−1, the receiving processor begins processing PUSCH group Z 403$t$−1 according to previously received 404$t$−1 and does not wait for the transmission and processing of DMRS 404$t$ to begin processing PUSCH group Z 403$t$−1. In short, the receiving processor gets a jump start on its ability to process PUSCH group Z 403$t$−1 thereby giving it more time to accomplish the processing as compared to the other PUSCH symbols included in current UL frame 400$t$.

It is noted that PUSCH group Z 403$t$−1 is delayed and transmitted in current UL frame 400$t$ as opposed to its originally intended frame of previous UL frame 400$t$−1. However, being that PUSCH group Z 403$t$−1 was previous identified as including information of a type that is not time pertinent, delaying transmission of the symbols by a one or more frame is inconsequential to the overall operation of the system.

From the above, one can see how previous UL frame 400$t$−1 was arranged by transmitting processor including: PUCCH 401$t$−1, G 402$t$−1, PUSCH group Z 403$t$−2 (PUSCH symbol 403$^a t$−2 through PUSCH symbol 403$^n t$−2), DMRS 404$t$−1, PUSCH group X 405$t$−1 (PUSCH symbol 405$^a t$−1 through PUSCH symbol 405$^n t$−1), PUSCH group Y 406$t$−1 (PUSCH symbol 406$^a t$−1 through PUSCH symbol 406$^n t$−1), and G' 407$t$−1, as well as additional previous UL frames and additional successor UL frames.

FIG. 4$c$ illustrates an example method 4000, which selectively arranges the transmissions of one or more UL frames. In step 4001, the transmitting processor receives and decodes Ack/Nack information, which may have been included in a PUCCH. The transmitting processor uses at least the Ack/Nack information to determine which symbols will be transmitted in the PUSCHs of the current frame (e.g., current UL frame 400$t$). The Ack/Nack information is received from the receiving processor that receives the UL frames described herein. In step 4002, the transmitting processor performs processing during time gap G (e.g., G

402*t*). In step 4003, after time gap G, the transmitting processor transmits a PUSCH group whose transmission was delayed (e.g., PUSCH group Z 403*t*–1) from a previous UL frame (e.g., previous UL frame 400*t*–1). In step 4004, after transmission of the PUSCH group whose transmission was delayed (e.g., PUSCH group Z 403*t*–1), the transmitting processor transmits a DMRS for the current UL frame (e.g., DMRS 404*t*). This DMRS corresponds to the symbols that follow the DMRS. In step 4005, after transmission of the DMRS, the transmitting processor transmits a PUSCH group that was prioritized as having a higher or highest priority rating (e.g., because the system prefers the group be processed during a single frame (e.g., PUSCH group X 405*t*)). In step 4006, after transmitting the PUSCH group that was prioritized as having a higher or highest priority (e.g., PUSCH group X 405*t*), the transmitting processor transmits a PUCSH group that was prioritized as having a non-highest priority (e.g., comparatively less important (e.g., PUSCH group Y 406*t*)). In step 4007, a time gap G' (e.g., G 407*t*) is scheduled to allow the transmitting processor (and the receiving processor) time to perform processing, for example, processing in preparation for the next UL frame. Afterwards, the steps may be repeated for the next UL frame.

The foregoing concepts are applicable with respect to a number of communication system and network element configurations. For example, the exemplary implementations discussed may be utilized with respect to network elements having single input single output (SISO), single input multiple output (SIMO), multiple input single output (MISO), and/or multiple input multiple output (MIMO) configurations. With MIMO beamforming, uplink-downlink mixed interference is likely to have less impact due in part because transmit beamforming allows the transmitter to control the directionality of its signal, receiver nulling allows the receiver to emphasize its desired signal over the interference, and/or 3D antenna array configuration allows further interference rejection due to elevation angular separation. Nevertheless, the use of jamming graph for a MIMO configuration is similar to that of a SISO configuration. A few refinements to be considered with respect to a MIMO configuration, however, include the beamforming direction may be selected keeping mixed interference in mind to reduce jamming impact (e.g., the beam selection may be performed in a way that maximizes the signal to leakage ratio), the IoT resulting from the best beam direction should be compared with the tolerable IoT to determine the power back-off, and the IoT computation should take into account the MIMO beamforming, receiver nulling and elevation angular separation.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in the figures may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A wireless communication method comprising:
    grouping a plurality of Physical Downlink Shared Channels (PDSCH)s into a plurality of PDSCH groups;
    generating, via a transmit processor, a current DL frame arranged such that a PDSCH group having a highest priority rating is located after a Demodulation Reference Signal (DMRS) of the current DL frame;
    including within the current DL frame, via the transmit processor, one of the PDSCH groups having a non-highest priority rating, wherein the one of the PDSCH groups having a non-highest priority rating is located after the PDSCH group having the highest priority rating; and
    wirelessly transmitting, via the one or more antennas, the current DL frame.

2. The method of claim 1 further comprising:
    delaying, via the transmit processor, another of the PDSCH groups having a non-highest priority rating such that the another of the PDSCH groups is excluded from the current DL frame.

3. The method of claim 2 further comprising:
    generating, via the transmit processor, a subsequent DL frame; and
    including within the subsequent DL frame, via the transmit processor, the another of the PDSCH groups.

4. The method of claim 1 further comprising:
    including within the current DL frame, via the transmit processor, a previously delayed PDSCH group, wherein a previously delayed PDSCH group is a PDSCH group that was delayed from a previous DL frame.

5. The method of claim 4 wherein the including within the current DL frame the previously delayed PDSCH group comprises:
    including the previously delayed PDSCH group before the DMRS of the current DL frame.

6. The method of claim 4 wherein Ack/Nack information regarding the delayed PDSCH group that is included within the current DL frame is received during the transmission of the current DL frame.

7. The method of claim 1 wherein Ack/Nack information regarding the PDSCH group having the highest priority rating is received during transmission the current DL frame.

8. The method of claim 1 wherein Ack/Nack information regarding the one of the PDSCH groups having a non-highest priority rating that is located within the current DL frame is received during transmission of the subsequent DL frame.

9. The method of claim 1 wherein Ack/Nack information regarding the another of the PDSCH groups having a non-highest priority rating that is within the subsequent DL frame is received during the subsequent DL frame.

10. The method of claim 1 wherein the including the one of the PDSCH groups having a non-highest priority rating after the PDSCH group having a highest priority rating provides the receiving processor sufficient time to send Ack/Nack information regarding the PDSCH group having a highest priority rating while the current DL frame is transmitting.

11. The method of claim 1 further comprising:
    receiving the DL frame, wherein the DL frame comprises a plurality of PDSCH groups, wherein a PDSCH group includes a group of individual PDSCHs;
    processing at least one PDSCH group of the plurality of PDSCH groups and transmitting Ack/Nack information corresponding to the at least one PDSCH within the DL frame; and
    processing at least another PDSCH group of the plurality of PDSCH groups and transmitting Ack/Nack information corresponding to the at least another PDSCH within a subsequent DL frame, which is transmitted after the DL frame.

12. A system that generates Downlink (DL) frames transmission having selectively arranged data for wireless transmission, the system comprising:
    at least one processor that generates a plurality of Physical Downlink Shared Channels (PDSCH)s and groups the PDSCHs into a plurality of PDSCH groups,
    wherein the at least one processor further generates a current DL frame such that:
        a PDSCH group having a highest priority rating is located after a Demodulation Reference Signal (DMRS) of the current DL frame, and
        one of the PDSCH groups having a non-highest priority rating is located within the current DL frame after the PDSCH group having the highest priority rating; and
    at least one transmitter that transmits the current DL frame and a subsequent DL frame.

13. The system of claim 12 wherein the at least one processor delays another of the PDSCH groups having a non-highest priority rating and generates the subsequent DL frame within which the another of the PDSCH groups is included.

14. The system of claim 13 wherein Ack/Nack information regarding the another of the PDSCH groups having a non-highest priority rating that is within the subsequent DL frame is received during the subsequent DL frame.

15. The system of claim 12 wherein the at least one processor arranges the current DL frame such that a delayed PDSCH group, which was delayed from a previous DL frame, is included within the current DL frame.

16. The system of claim 15 wherein the at least one processor locates the delayed PDSCH group that is within the current DL frame before the DMRS of the current DL frame.

17. The system of claim 15 wherein Ack/Nack information regarding the delayed PDSCH group that is within the current DL frame is received during the current DL frame.

18. The system of claim 12 wherein Ack/Nack information regarding the PDSCH group having a highest priority rating is received during the current DL frame.

19. The system of claim 12 wherein Ack/Nack information regarding the one of the PDSCH groups having a non-highest priority rating that is within the current DL frame is received during the subsequent DL frame.

20. The system of claim 12 wherein the including the one of the PDSCH groups having a non-highest priority rating after the PDSCH group having a highest priority rating provides the receiving processor sufficient time to send Ack/Nack information regarding the PDSCH group having a highest priority rating while the current DL frame is transmitting.

21. The system of claim 12 further comprising:
at least one receiver that receives the DL frame, wherein the DL frame comprises a plurality of PDSCH groups, wherein a PDSCH group includes a group of individual PDSCHs; and
at least one processor that processes at least one PDSCH group of the plurality of PDSCH groups and processes at least another PDSCH group of the plurality of PDSCH groups; and
at least one transmitter that transmits Ack/Nack information corresponding to the at least one PDSCH within the DL frame and transmits Ack/Nack information corresponding to the at least another PDSCH within a subsequent DL frame.

22. A non-transitory computer-readable medium having program code recorded thereon, which causes a wireless communication transmit processor to selectively arrange data of Downlink (DL) frames for wireless transmission, the program code comprising:
program code causing the wireless communication transmit processor to group a plurality of Physical Downlink Shared Channels (PDSCH)s into a plurality of PDSCH groups;
program code causing the wireless communication transmit processor to generate a current DL frame arranged such that a PDSCH group having a highest priority rating is located after a Demodulation Reference Signal (DMRS) of the current DL frame;
program code causing the wireless communication transmit processor to include within the current DL frame one of the PDSCH groups having a non-highest priority rating, wherein the one of the PDSCH groups having a non-highest priority rating is located after the PDSCH group having the highest priority rating; and
program code causing one or more antennas to wirelessly transmit the current DL frame.

23. The non-transitory computer-readable medium of claim 22 further comprising:
program code for delaying, via the transmit processor, another of the PDSCH groups having a non-highest priority rating such that the another of the PDSCH groups is excluded from the current DL frame.

24. The non-transitory computer-readable medium of claim 23 further comprising:
program code for generating, via the transmit processor, a subsequent DL frame; and
including within the subsequent DL frame, via the transmit processor, the another of the PDSCH groups.

25. The non-transitory computer-readable medium of claim 23 further comprising:
program code causing the wireless communication transmit processor to receive the DL frame, wherein the DL frame comprises a plurality of Physical Downlink Shared Channels PDSCH groups, wherein a PDSCH group includes a group of individual PDSCHs;
program code causing the wireless communication transmit processor to process at least one PDSCH group of the plurality of PDSCH groups and transmitting Ack/Nack information corresponding to the at least one PDSCH within the DL frame;
program code causing the wireless communication transmit processor to process at least another PDSCH group of the plurality of PDSCH groups; and,
program code for causing one or more antennas to transmit Ack/Nack information corresponding to the at least another PDSCH within a subsequent DL frame, which is transmitted after the DL frame.

26. The non-transitory computer-readable medium of claim 22 further comprising:
program code for including within the current DL frame, via the transmit processor, a previously delayed PDSCH group, wherein a previously delayed PDSCH group is a PDSCH group that was delayed from a previous DL frame.

27. The non-transitory computer-readable medium of claim 26 further comprising:
program code for locating the delayed PDSCH group, via the transmit processor, that is within the current DL frame before the DMRS of the current DL frame.

28. The non-transitory computer-readable medium of claim 26 wherein Ack/Nack information regarding the delayed PDSCH group that is within the current DL frame is received during the current DL frame.

29. The non-transitory computer-readable medium of claim 22 wherein Ack/Nack information regarding the PDSCH group having a highest priority rating is received during the current DL frame.

30. The non-transitory computer-readable medium of claim 22 wherein Ack/Nack information regarding the one of the PDSCH groups having a non-highest priority rating that is located within the current DL frame is received during transmission of the subsequent DL frame.

* * * * *